(12) United States Patent
Andersson et al.

(10) Patent No.: US 9,493,137 B2
(45) Date of Patent: Nov. 15, 2016

(54) HYDROGEN STORAGE ENCLOSURE

(71) Applicant: AUTOLIV DEVELOPMENT AB, Vårgårda (SE)

(72) Inventors: Ronnie Andersson, Mölndal (SE); Niclas Hornquist, Anderstorp (SE); Mats Johanson, Fristad (SE); Tobias Aderum, Göteborg (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 25 days.

(21) Appl. No.: 14/381,035

(22) PCT Filed: Feb. 21, 2013

(86) PCT No.: PCT/EP2013/053500
§ 371 (c)(1),
(2) Date: Aug. 26, 2014

(87) PCT Pub. No.: WO2013/127692
PCT Pub. Date: Sep. 6, 2013

(65) Prior Publication Data
US 2015/0048605 A1 Feb. 19, 2015

(30) Foreign Application Priority Data
Mar. 2, 2012 (FR) ..................... 12 00637

(51) Int. Cl.
*B60R 21/26* (2011.01)
*B60R 21/268* (2011.01)
*B60R 21/272* (2006.01)

(52) U.S. Cl.
CPC ............. *B60R 21/26* (2013.01); *B60R 21/268* (2013.01); *B60R 2021/26082* (2013.01); *B60R 2021/2725* (2013.01); *Y02E 60/321* (2013.01)

(58) Field of Classification Search
CPC ................. B60R 21/26; B60R 2021/26052; B60R 2021/2642; B60R 21/268; B60R 2021/2685
USPC .................... 280/741; 102/530, 531
See application file for complete search history.

(56) References Cited

U.S. PATENT DOCUMENTS

| | | | |
|---|---|---|---|
| 3,912,458 A | 10/1975 | Fukuma et al. | |
| 5,016,914 A | 5/1991 | Faigle et al. | |
| 5,884,938 A * | 3/1999 | Rink | B60R 21/264 280/737 |
| 6,877,435 B2 * | 4/2005 | Daoud | B60R 21/2171 102/530 |
| 6,918,340 B2 * | 7/2005 | Daoud | B60R 21/2644 102/202 |
| 7,514,153 B1 | 4/2009 | Archer, Jr. et al. | |
| 2003/0001370 A1 * | 1/2003 | Ryobo | B60R 21/272 280/741 |
| 2005/0061404 A1 | 3/2005 | Erike | |
| 2005/0183424 A1 * | 8/2005 | Bradley | F17C 11/005 62/46.1 |
| 2009/0199574 A1 * | 8/2009 | Hirose | C01B 3/0005 62/46.1 |
| 2009/0301601 A1 * | 12/2009 | Enerson | C06B 43/00 141/38 |

(Continued)

OTHER PUBLICATIONS

International Search Report and Written Opinion of the ISA for PCT/EP2013/053500, ISA/EP, mailed May 17, 2013.

*Primary Examiner* — Toan To
(74) *Attorney, Agent, or Firm* — Stephen T. Olson; Harness, Dickey & Pierce, P.L.C.

(57) ABSTRACT

A gas generator for an airbag includes a storage container and at least one chamber defined by the storage container. The at least one chamber infludes a metal wall and contains at least gaseous hydrogen. A coating layer of iron oxide is disposed on at least a surface portion of the metal wall to prevent diffusion of hydrogen atoms through the metal wall.

23 Claims, 1 Drawing Sheet

(56) References Cited

U.S. PATENT DOCUMENTS

| | | |
|---|---|---|
| 2010/0024926 A1 | 2/2010 | Nagao et al. |
| 2010/0045009 A1* | 2/2010 | Kelley ................ B60R 21/2644 280/741 |
| 2011/0025030 A1* | 2/2011 | Mendenhall ............ C06B 45/12 280/741 |
| 2011/0302933 A1 | 12/2011 | Immel |
| 2013/0276664 A1* | 10/2013 | Ohsugi ............... B60R 21/2644 102/530 |

\* cited by examiner

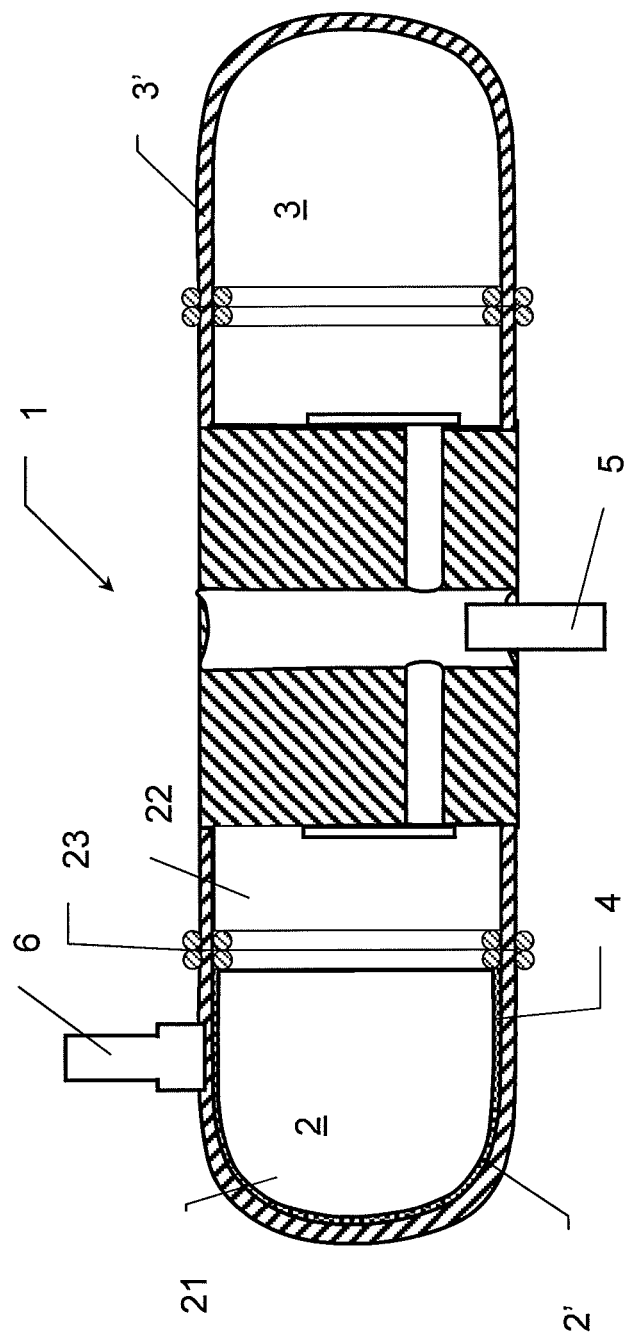

HYDROGEN STORAGE ENCLOSURE

CROSS-REFERENCE TO RELATED APPLICATIONS

This application is a 371 U.S. National Stage of International Application No. PCT/EP2013/053500, filed Feb. 21, 2013. This application claims priority to French Patent Application No. 12/00637, filed Mar. 2, 2012. The entire disclosures of the above applications are incorporated herein by reference.

FIELD

The present invention relates in general to a reliable storage enclosure which has an improved service life.

BACKGROUND

Storage enclosures serving for example as pyrotechnic and hybrid gas generators containing propergol for inflation of airbags are known from prior art. However, propergols are expensive products which give off effluents and hot particles which need filtering. It is therefore useful to propose storage enclosures which use a less expensive raw material and produce neither particles nor effluents. Prior art describes storage enclosures using gaseous oxygen and gaseous hydrogen which are each confined in a chamber which has a metal wall or are both confined in a single gas reserve. A problem of these enclosures is that the hydrogen confined in the metal chamber tends, when in contact with steel, to is disassociate such that it may escape by diffusion through the metal wall and recombine on the other side of the wall. The enclosures may lose their inflation capabilities and no longer meet the performance criteria specified by vehicle manufacturers.

Patent specification US 2010/0024926 describes a metal coated with a protective layer formed by galvanisation of Zinc to protect the metal from hydrogen with the object of increasing the metal's resistance to delayed fracture. In contrast, patent specification U.S. Pat. No. 7,514,153 describes a process of coating a metal surface which consists in plating a Zinc-Nickel alloy on the surface to provide protection against hydrogen and therefore against corrosion, preventing embrittlement due to release of hydrogen when the process is employed. However, these specifications relate primarily to embrittlement of the metal on which the protective layer is formed and offer no solution to the hydrogen tightness problem described above. Moreover, these processes may give rise to emissions which degrade the welds which may subsequently be made on the surfaces treated.

SUMMARY

An object of the present invention is to respond to the disadvantages of the prior art specifications mentioned above and in particular, first of all, to propose a reliable storage enclosure provided with a chamber which has improved tightness to hydrogen.

To this end, a first aspect of the invention relates to a storage enclosure comprising at least one chamber provided with a metal wall and containing at least gaseous hydrogen, characterised in that said chamber has a coating layer of iron oxide disposed on at least a surface portion of the metal wall. The coating layer thus prevents hydrogen atoms from diffusing through the metal wall.

In a particularly useful version the coating layer consists of $Fe_3O_4$. Thus the coating layer, as well as improving the impermeability, affords improved stability relative to other metal oxides and gives the parts a good appearance, thereby reducing dirt and associated cleaning operations on assembly lines. Moreover, the $Fe_3O_4$ coating causes no problems when the part treated is welded, e.g. by friction or resistance welds.

With advantage, the coating layer is provided on the inside surface of the metal wall. Thus hydrogen will not penetrate the metal wall and no contamination or embrittlement will be caused.

Alternatively, the coating layer is provided on both the inside surface and the outside surface of the metal wall. Thus the coating layer may be made more easily by treating the whole metal part, e.g. by immersion. Moreover, tightness is further improved relative to a single layer.

With advantage, the storage enclosure consists in a gas generator for airbag. Thus it is possible to achieve a gas generator for airbag which has improved tightness to hydrogen.

In a particularly useful version the coating layer is provided on at least a surface portion such as to limit the decline in performance of the gas generator to 10% over a period of 15 years. Thus the costs may be reduced and the process of making the coating layer is facilitated in there being no need to coat difficult places, nor areas where the treatment would be contra-indicated, e.g. for assembly purposes.

With advantage, the chamber further contains an inert gas. Thus leakage may easily be detected.

With advantage, the chamber is composed of two portions welded together. This makes it possible to facilitate the process of manufacturing the storage enclosure.

With advantage, the coating layer is provided on the whole of the inside and/or outside surface of one of the two portions. Thus the process of manufacturing said enclosure may still further be facilitated.

In a particularly useful version the layer has a thickness of from 0.1 µm inclusive to 2 µm inclusive. Thus impermeability to hydrogen may be ensured by negligibly reducing the volume of the enclosure.

In a still more useful version the layer has a thickness of from 0.1 µm inclusive to 0.5 µm inclusive. Thus impermeability to hydrogen may be ensured by still more negligibly reducing the volume of the enclosure.

A second aspect of the invention relates to an airbag module comprising a storage enclosure according to the first aspect of the invention.

A third aspect of the invention relates to a vehicle provided with a storage enclosure according to the first aspect of the invention.

A fourth aspect of the invention relates to a fuel cell provided with a is storage enclosure according to the first aspect of the invention.

DESCRIPTION OF THE DRAWINGS

Other characteristics and advantages of the present invention will become more clearly apparent from reading the detailed description set out below of an embodiment of the invention, given by way of non-limitative example and illustrated by the annexed drawing, in which:

FIG. 1 depicts a storage enclosure according to the first aspect of the invention.

DETAILED DESCRIPTION

FIG. 1 depicts in this example a storage enclosure 1 consisting in a gas generator for airbag, comprising an igniter 5, a chamber 2 containing hydrogen and a chamber 3 containing oxygen, each chamber having a steel confinement wall 2', 3', preferably made of high yield point steel conforming to standard EN1019, imprisoning the gas in the corresponding chamber 2, 3. In an alternative embodiment not depicted, the chamber 2 might also contain an inert gas for detecting any leaks, or else gaseous oxygen.

As may be seen in FIG. 1, the chamber 2 containing hydrogen consists of two portions 21 and 22 fixed together, at a fixing line 23, e.g. by a friction weld.

As explained above, hydrogen in contact with steel tends to disassociate such that it may escape by diffusion through the metal wall and recombine on the other side of the wall. To prevent this, a surface of the first portion 21 of the chamber 2 is treated by black oxidation such as to form a coating layer 4 on the whole of the inside surface of the first portion 21, as illustrated in FIG. 1, and therefore on a partial inside surface of the hydrogen chamber 2. Alternatively, although this is not depicted in the drawing, this coating layer 4 may be formed on both the inside surface and the outside surface of the first portion 21 by immersing the whole of the piece treated, i.e. the first portion 21, in a bath, for example, according to DIN-50938.

The coating layer is an iron oxide such as $Fe_2O_3$ or preferably $Fe_3O_4$ which is more stable. As any surface treatment causes extra cost, it may be desirable to treat only the surface needed for conforming to the specifications. The amount of surface to be treated will generally depend on several factors, such as the amount of gas confined in the chamber, the storage pressure of the gas or else the shape of the chamber. Despite this, it is generally desirable to treat the surface in such a way that the decline in performance of the generator is less than 10% after 15 years. Ideally, the surface is treated such that the coating layer has a thickness of from 0.1 inclusive to 2 μm inclusive, preferably from 0.1 inclusive to 0.5 μm inclusive. Measurement of the thickness of the coating layer may be by electronic scanning microscope.

FIG. 1 further depicts a stud 6 fixed, for example, by welding, e.g. by friction or resistance welding, on the chamber 2, whether the chamber is coated or not, without the coating impairing the welding. Although not depicted, another stud might also be fixed on the other chamber 3.

However, the invention is not restricted to this particular embodiment and the storage enclosure might for example consist in a portion of a fuel cell, an enclosure intended for transport of hydrogen or else for hydrogen reserves on board a vehicle to assist propulsion.

Alternatively, it is also possible that the storage enclosure be only a temporary storage enclosure, such as a supply line, in order to eliminate any loss when the hydrogen is passing through the line.

It will be understood that sundry modifications and/or improvements obvious to one skilled in the art may be applied to the various embodiments of the invention described in the present description without departing from the scope of the invention which is defined by the annexed claims, e.g. the thickness of the coating layer might be more than one molecule, the coating layer might be formed or deposited by other known processes.

The invention claimed is:

1. A gas generator for an airbag, the gas generator comprising:
   a storage enclosure;
   at least one chamber defined by the storage enclosure, the at least one chamber including a metal wall;
   at least gaseous hydrogen contained in the at least once chamber; and
   a coating layer of iron oxide disposed on at least a surface portion of the metal wall, the coating layer operative to prevent diffusion of hydrogen atoms through the metal wall.

2. The gas generator according to claim 1, wherein the coating layer is Fe3O4.

3. The gas generator according to claim 1, wherein the coating layer is provided on an inside surface of the metal wall.

4. The gas generator according to claim 1, wherein the coating layer is provided on both an inside surface and an outside surface of the metal wall.

5. The gas generator according to claim 1, wherein the coating layer limits a decline in performance of the gas generator.

6. The gas generator according to claim 1, wherein the at least one chamber further contains an inert gas.

7. The gas generator according to claim 1, wherein that at least one chamber includes two portions welded together.

8. The gas generator according to claim 7, wherein the coating layer is provided on a whole of an inside surface and/or an outside surface of the two portions of the at least one chamber.

9. The gas generator according to claim 1, wherein the coating layer has a thickness of from 0.1 μm inclusive to 2 μm inclusive.

10. The gas generator according to claim 1, wherein the coating layer has a thickness of from 0.1 μm inclusive to 0.5 μm inclusive.

11. The gas generator according to claim 1, wherein the gas generator is adapted to store hydrogen temporarily.

12. The gas generator according to claim 1, in combination with an airbag module.

13. The gas generator and airbag module of claim 1, in combination with a vehicle.

14. A method of preventing diffusion of hydrogen atoms from a gas generator having at least one chamber defined by a metal wall and at least gaseous hydrogen in the at least one chamber, the method comprising:
   filling the at least one chamber with gaseous hydrogen;
   coating the at least one chamber with a layer of iron oxide disposed on at least a surface portion of the metal wall; and
   preventing diffusion of hydrogen atoms through the metal wall with the layer of iron oxide.

15. The method of claim 14, wherein coating the at least one chamber includes coating the at least one chamber with the layer having a thickness of from 0.1 μm inclusive to 2.0 μm inclusive.

16. The method of claim 14, wherein coating the at least one chamber includes coating the at least one chamber with the layer having a thickness of from 0.1 μm inclusive to 0.5 μm inclusive.

17. The gas generator according to claim 1, wherein the coating layer is provided on a whole of an inside surface and/or an outside surface of the at least one chamber.

18. The method of claim 14, wherein coating the at least one chamber includes coating a whole of an inside surface and/or an outside surface of the at least one chamber.

19. The method of claim 18, wherein coating the at least one chamber includes coating a whole of an inside surface and/or an outside surface of the at least one chamber.

20. The method of claim 19, wherein coating the at least one chamber includes coating a whole of an inside surface and/or an outside surface of the at least one chamber.

21. A gas generator for an airbag, the gas generator comprising:

a storage enclosure;

at least one chamber defined by the storage enclosure, the at least one chamber including a metal wall;

at least gaseous hydrogen contained in the at least one chamber; and a coating layer of iron oxide disposed on at least a surface portion of the metal wall, the coating layer operative to prevent diffusion of hydrogen atoms through the metal wall, wherein the coating layer is provided on a whole of an inside surface and/or an outside surface of the at least one chamber.

22. The gas generator according to claim 21, wherein the at least one chamber includes two chambers and further wherein the coating layer is provided on the whole of the inside surface and/or the outside surface of the two portions of the at least one chamber.

23. The gas generator according to claim 22, wherein the two portions are welded together.

* * * * *